United States Patent
Petrell et al.

(10) Patent No.: US 12,360,595 B1
(45) Date of Patent: Jul. 15, 2025

(54) EYE POSITION BASED SPATIAL ANCHORS FOR HEADS-UP DISPLAYS

(71) Applicant: Distance Technologies Oy, Helsinki (FI)

(72) Inventors: Joona Petrell, Tampere (FI); Mikko Strandborg, Hangonkylä (FI); Jetro Lauha, Kerava (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/175,597

(22) Filed: Apr. 10, 2025

(51) Int. Cl.
| | |
|---|---|
| *G06F 3/01* | (2006.01) |
| *G02B 27/01* | (2006.01) |
| *G06T 15/20* | (2011.01) |

(52) U.S. Cl.
CPC ......... *G06F 3/013* (2013.01); *G02B 27/0101* (2013.01); *G02B 27/0179* (2013.01); *G06T 15/205* (2013.01); *G02B 2027/0187* (2013.01); *G06T 2210/12* (2013.01)

(58) Field of Classification Search
CPC . G06F 3/013; G02B 27/0101; G02B 27/0179; G02B 2027/0187; G06T 15/205; G06T 2210/12
See application file for complete search history.

(56) References Cited

U.S. PATENT DOCUMENTS

| | | | |
|---|---|---|---|
| 2016/0049013 A1* | 2/2016 | Tosas Bautista | G06F 3/012 345/633 |
| 2018/0003972 A1* | 1/2018 | Kress | G02B 27/0172 |
| 2021/0051315 A1* | 2/2021 | Shamir | G06T 7/571 |
| 2021/0300183 A1* | 9/2021 | Kondo | B60K 35/211 |
| 2023/0026638 A1* | 1/2023 | Schoen | G06F 3/012 |
| 2023/0273673 A1* | 8/2023 | Gompertz | H04R 1/1091 341/20 |
| 2024/0087491 A1* | 3/2024 | Jiang | B60K 35/81 |
| 2024/0094809 A1* | 3/2024 | Zhang | G06V 10/145 |
| 2024/0385436 A1* | 11/2024 | Dehkordi | G06F 3/012 |
| 2025/0005869 A1* | 1/2025 | Lal | G06V 10/462 |

* cited by examiner

Primary Examiner — Ryan A Lubit
(74) Attorney, Agent, or Firm — Ziegler IP Law Group LLC.

(57) ABSTRACT

A relative position of a given eye of user(s) is determined with respect to a semi-reflective surface of an optical combiner, using a tracker. A given reflection region is identified on the semi-reflective surface from which light emitted by a light-emitting surface (122, 606) of an autostereoscopic display is reflected toward the given eye. A given three-dimensional (3D) view frustum corresponding to the given eye is determined. For a given virtual depth at which graphical element(s) is/are to be presented, a frustum cross-section of the given 3D view frustum is determined at the given virtual depth relative to the given eye. Spatial anchor(s) is/are positioned at predefined position(s) on the frustum cross-section. A position for the graphical element(s) on the frustum cross-section is determined relative to the spatial anchor(s). A given image for presenting the graphical element(s) to the given eye, is determined, the graphical element(s) being positioned at the determined position.

17 Claims, 4 Drawing Sheets

EYE POSITION BASED SPATIAL ANCHORS FOR HEADS-UP DISPLAYS

TECHNICAL FIELD

The present disclosure relates to systems incorporating eye position based spatial anchors for heads-up displays (HUDs). The present disclosure also relates to methods incorporating eye position based spatial anchors for HUDs.

BACKGROUND

Autostereoscopic display systems (for example, such as heads-up displays (HUDs)) have become increasingly popular in modern vehicles for delivering key information like vehicle speed, navigation guidance, and rear-view visuals to drivers. While traditional HUDs typically display two-dimensional (2D) content at specific distances using projectors or lenses, the autostereoscopic display systems go a step further by enabling presentation of stereoscopic or 3D content. These autostereoscopic display systems are often integrated into windshields through optical combiners that reflect display content into the driver's line of sight.

However, existing autostereoscopic display systems are limited in their ability to adapt dynamically to changes in user's head position and to complex geometries of modern optical combiners. Unlike traditional 2D displays, a field of view and a stereo image produced by an autostereoscopic display are highly dependent on the user's head position, including an eye distance, an eye height, and a horizontal head position relative to the windshield. This makes it difficult to define a fixed area (namely, a "canvas") for displaying visual content, as it constantly changes based on the user's head position and/or a viewing angle. A curvature of the windshield further exacerbates these challenges, introducing additional complexities in maintaining consistent visibility of virtual elements. A bottom curvature of the windshield causes a lower edge of a visible area to vary depending on a height of the user, making it difficult to position the virtual elements on the lower edge consistently. If the user is shorter, virtual element intended to appear at a center of a display may instead appear tilted or misaligned. Similarly, if the user sits farther back, the user's field of view of the autostereoscopic display shrinks, and some HUD elements risk being clipped out of view. Horizontal head movements, such as leaning slightly left or right, can also distort a perceived position of the virtual elements, further complicating their positioning. All such issues are not limited to the lower edge of the visible area; positioning the virtual elements on an upper edge of the visible area can also be challenging, particularly when the windshield is not fully symmetrical. For example, a driver's side of the windshield may be more curved on the road-facing side and flatter near the center, creating uneven visibility across the visible area.

Some existing systems attempt to address these challenges by allowing users to manually adjust a height of their seat to ensure that virtual elements are visible. However, such manual adjustments are cumbersome for most users and do not provide a dynamic or user-friendly solution. Moreover, some existing autostereoscopic display systems employ fixed or static spatial positioning of virtual elements. This results in sub-optimal visibility as virtual elements can appear partially or fully obstructed to the user or blocking a user's view of a real world environment. This is particularly problematic for light field-based HUDs.

Therefore, in light of the foregoing discussion, there exists a need to overcome the aforementioned drawbacks.

SUMMARY

The present disclosure seeks to provide a system and a method to dynamically adapt positioning of graphical elements in autostereoscopic displays based on eye position of users in relation to the autostereoscopic displays. The aim of the present disclosure is achieved by a system and a method incorporating eye position-based spatial anchors that facilitate in presenting graphical elements such that they remain always visible to a user in a clear and unobstructed manner, regardless of changes in user's head position or viewing directions of eyes of the user, thereby improving an overall viewing experience of the user, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 5A illustrates an exemplary top view of different three-dimensional (3D) view frustums corresponding to different eye positions, while

DETAILED DESCRIPTION OF EMBODIMENTS

Figure 1:
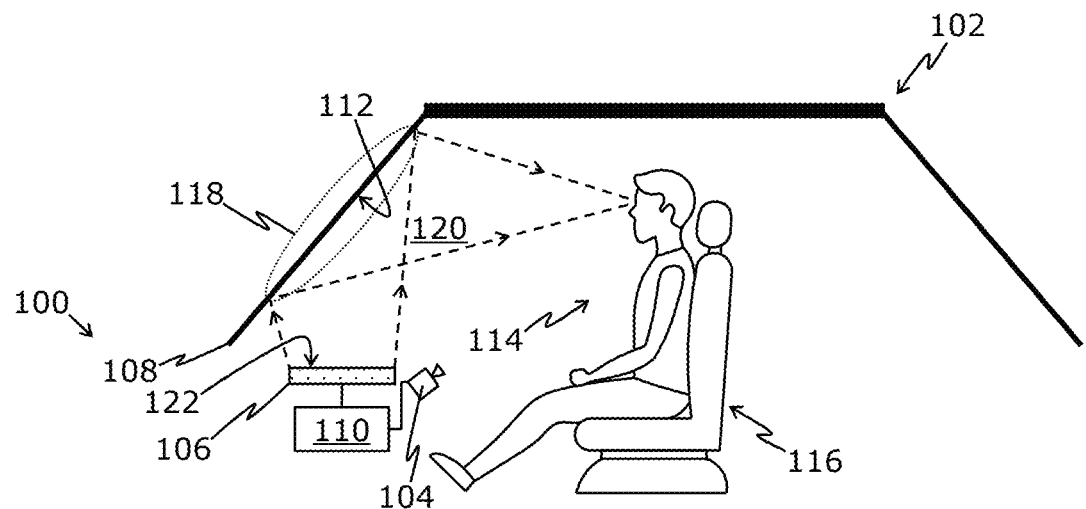
FIG. 1 illustrates a simplified example implementation of a system incorporating eye position based spatial anchors for a heads-up display, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
- a tracker;
- an autostereoscopic display;
- an optical combiner arranged on an optical path of the autostereoscopic display; and
- at least one processor configured to:
  - determine a relative position of a given eye of at least one user with respect to a semi-reflective surface of the optical combiner, using the tracker;
  - identify a given reflection region on the semi-reflective surface from which light emitted by a light-emitting surface of the autostereoscopic display is reflected toward the given eye, based on: (i) the relative position of the given eye with respect to the semi-reflective surface, (ii) a position, orientation, size and curvature of the semi-reflective surface, and (iii) a position, orientation, size and curvature of the light-emitting surface;
  - determine a given three-dimensional (3D) view frustum corresponding to the given eye, based on the given reflection region on the semi-reflective surface, and the relative position of the given eye with respect to the semi-reflective surface;
  - for a given virtual depth at which at least one graphical element is to be presented, determine a frustum cross-section of the given 3D view frustum at the given virtual depth relative to the given eye;
  - position at least one spatial anchor at: at least one predefined position on the frustum cross-section;
  - determine a position for the at least one graphical element on the frustum cross-section relative to the at least one spatial anchor; and
  - generate a given image for presenting the at least one graphical element to the given eye, positioning the at least one graphical element at the determined position.

In a second aspect, an embodiment of the present disclosure provides a method comprising:
- determining a relative position of a given eye of at least one user with respect to a semi-reflective surface of an optical combiner, using a tracker, the optical combiner being arranged on an optical path of an autostereoscopic display;
- identifying a given reflection region on the semi-reflective surface from which light emitted by a light-emitting surface of the autostereoscopic display is reflected toward the given eye, based on: (i) the relative position of the given eye with respect to the semi-reflective surface, (ii) a position, orientation, size and curvature of the semi-reflective surface, and (iii) a position, orientation, size and curvature of the light-emitting surface;
- determining a given three-dimensional (3D) view frustum corresponding to the given eye, based on the given reflection region on the semi-reflective surface, and the relative position of the given eye with respect to the semi-reflective surface;
- for a given virtual depth at which at least one graphical element is to be presented, determining a frustum cross-section of the given 3D view frustum at the given virtual depth relative to the given eye; positioning at least one spatial anchor at: at least one predefined position on the frustum cross-section;
- determining a position for the at least one graphical element on the frustum cross-section relative to the at least one spatial anchor; and
- generating a given image for presenting the at least one graphical element to the given eye, positioning the at least one graphical element at the determined position.

The present disclosure provides the aforementioned system and the aforementioned method that offer several technical benefits over the prior art in terms of placement of graphical elements in autostereoscopic displays. First, unlike the prior art that rely on fixed or static placement of graphical elements, the system and the method of the present disclosure take into account the relative position of the given eye in real time, for positioning the at least one spatial anchor on the frustum cross-section and then utilising the at least one spatial anchor to position the at least one graphical element in the given image. This ensures that the at least one graphical element would remain always visible (and usable) within the user's field of view, regardless of changes in user's head position or viewing direction of the given eye. Additionally, this eliminates a common problem of graphical elements becoming obstructed or misaligned in the user's field of view in some existing autostereoscopic display systems, as the user's head position or the viewing direction changes. Second, the system and the method provide an enhanced user experience by presenting the at least one graphical element at the given virtual depth that aligns with the user's natural viewing experience. Unlike existing autostereoscopic display systems which are prone to cause visual strain due to obstructions or inconsistent visibility of the graphical elements, the system and the method address provide a solution to position the at least one graphical element in a manner that it is always visible within the user's field of view, thereby reducing the visual strain and improving clarity/legibility of the at least one graphical element from all viewing directions. Third, the system and the method address the limitations of the prior art by providing enhanced adaptability for the placement of graphical elements on complex geometries, such as curved optical combiners integrated into windshields in automotive heads-up displays (HUDs). Unlike some existing autostereoscopic display systems, which struggle to accurately position and maintain the visibility of graphical elements on curved optical combiners due to their complex geometry and varying reflection angles, the system and the method ensure consistent visibility of the at least one graphical element irrespective of any variations in user's height and/or user's head position. This is because the reflection region on the optical combiner is identified by taking into account a curvature of the optical combiner, which subsequently results in positioning the at least one spatial anchor and the at least one graphical element highly accurately. Additionally, this adaptability makes the system and the method particularly susceptible to be used for automotive applications, where safety and usability are paramount. Together, these technical benefits provide an enhanced augmented reality experience, improving both usability and user comfort.

For illustration purposes, there will now be described how the system and the method work to achieve the aforementioned technical benefits. For clarity purposes, the aforementioned steps have been recited with respect to the given eye of the at least one user. These steps can be performed similarly for another eye of the at least one user as well. In other words, the step of determining the relative position, the step of identifying the given reflection region, the step of determining the given 3D view frustum, the step of determining the frustum cross-section, the step of positioning the at least one spatial anchor, the step of determining the position for the at least one graphical element, and the step of generating the given image can be performed for both eyes (namely, a left eye and a right eye) of the at least one user. In operation, the aforementioned steps can be performed as follows:

The relative location of the given eye of the at least one user with respect to the semi-reflective surface of the optical combiner is determined by utilising the tracker. Such trackers are well-known in the art. The term "given eye" encompasses the first eye and/or the second eye. The first eye could be one of the left eye and the right eye, while the second eye could be another of the left eye and the right eye.

The given reflection region is identified on the semi-reflective surface from which light emitted by the light-emitting surface of the autostereoscopic display is reflected toward the given eye, based on the (i) the relative position of the given eye with respect to the semi-reflective surface, (ii) a position, orientation, size and curvature of the semi-reflective surface, and (iii) a position, orientation, size and curvature of the light-emitting surface. In this regard, the position, orientation, size, and curvature of the semi-reflective surface are pre-known, as well as the position, orientation, size, and curvature of the light-emitting surface are also pre-known. It will be appreciated that the position, orientation, size, and curvature of the semi-reflective surface, and the position, orientation, size, and curvature of the light-emitting surface could change slightly, for example, due to temperature variations; however, such a change can be determined using well-known techniques in the art. The step of identifying the given reflection region on the semi-reflective surface can be performed using any suitable well-known technique.

It will be appreciated that by taking into account the aforementioned criteria (i), (ii), and (iii), it can be ensured that only visible portions of the autostereoscopic display are considered for identifying the given reflection region. If any part of the light emitted by the light-emitting surface is reflected outside a given boundary of the semi-reflective surface, said part of the light is not considered when identifying the given reflection region. This ensures that the at least one graphical element is accurately positioned with respect to at least one visible portion of the autostereoscopic display. It is to be understood that the optical combiner could either flat or curved. For a flat optical combiner, the curvature is a zero, whereas for a curved optical combiner, the curvature is non-zero. Similarly, the light-emitting surface could either flat or curved. In cases where the autostereoscopic display is flat, the curvature of the light-emitting surface can be zero. Optionally, when the system is implemented as an HUD, the optical combiner is arranged on an optical path of a real-world light field of a real-world environment also.

Throughout the present disclosure, the term "reflection region" refers to a region on the semi-reflective surface of the optical combiner from which the light emitted by the light-emitting surface of the autostereoscopic display is reflected toward the given eye. It will be appreciated that when the light is reflected toward the given eye, the given eye would see a reflection of the light-emitting surface from the given reflection region. This can be referred to as a "mirage" of the light-emitting surface as seen via the semi-reflective surface from a viewpoint of the given eye. In this regard, different eyes of the at least one user would see the reflection of the light-emitting surface from (slightly) different reflection regions. In other words, the different eyes of the at least one user correspond to the different reflection regions. Moreover, different relative positions of the given eye also correspond to different reflection regions, as the viewpoint of the given eye changes. It will also be appreciated that a shape of the given reflection region could be a well-defined shape (for example, such as a trapezoidal shape, a parallelogram shape, a rectangular shape, a circular shape, an elliptical shape, or similar) or an irregular shape (for example, such as a free-form shape, a distorted polygon shape, an asymmetrical curved shape, or similar).

The given 3D view frustum is determined corresponding to the given eye, based on the given reflection region on the semi-reflective surface, and the relative position of the given eye with respect to the semi-reflective surface. In this regard, the at least one processor can utilise the relative position of the given eye as an origin of the given 3D view frustum and calculate a path of light rays reflected toward the given eye from an entirety of the given reflection region, for defining imaginary boundaries of the 3D view frustum, which represents a volume in a 3D space being visible to the given eye. The step of determining the given 3D view frustum can be performed using any suitable well-known technique.

Throughout the present disclosure, the term "three-dimensional view frustum" refers to a volume in a 3D space that is visible to the given eye via the semi-reflective surface. The given 3D view frustum defines a 3D field-of-view (FOV) of the given eye. It will be appreciated that the shape of the given 3D view frustum is not necessarily a capped pyramid. Instead, a base face of the given 3D view frustum follows the shape of the reflection region (as discussed earlier). For example, in cases where the semi-reflective surface is curved, the base face of the given 3D view frustum may take on a free-form shape or an irregular shape. In such cases, the given 3D view frustum would be a deformed shape pyramid, potentially bending or warping in a non-uniform way, deviating from a regular truncated pyramid. As another example, in cases where the semi-reflective surface is flat, the base face of the given 3D view frustum may take on a trapezoidal shape or a rectangular shape. In such cases, the given 3D view frustum would be a truncated pyramid, for example, such as a regular truncated pyramid when the base face has the rectangular shape, or a skewed truncated pyramid when the base face has the trapezoidal shape. It will also be appreciated that the reflection of the light-emitting surface may not necessarily form a near plane of the given 3D view frustum. The at least one processor can define the given 3D view frustum in a manner that the at least one graphical element can also be positioned at a virtual depth that is closer to the given eye than the reflection region itself. This allows for greater flexibility in positioning graphical elements within the given 3D view frustum, ensuring that the graphical elements remain visible and optimally positioned for the given eye, even when placed at varying depths within the given 3D view frustum. Additionally, this ensures that the given 3D view frustum accurately represents a visible volume of the autostereoscopic display for the given eye, taking into account complex geometries of the optical combiner and various viewing conditions involved.

The frustum cross-section of the given 3D view frustum is determined at the given virtual depth relative to the given eye, the given virtual depth being a virtual depth at which the at least one graphical element is to be presented. In this regard, the given virtual depth is pre-known to the at least one processor as the at least one graphical element is generated by the at least one processor itself. The at least one processor can determine the frustum cross-section by determining a virtual plane intersecting the given 3D view frustum at the given virtual depth that is measured along a depth axis (namely, a Z-axis) of the autostereoscopic display. The frustum cross-section can be an orthogonal frustum cross-section or an oblique frustum cross-section of the given 3D view frustum, depending on the aforementioned criteria (i), (ii), and (iii).

Throughout the present disclosure, the term "graphical element" refers to a computer-generated element (namely, a digital element or a virtual element) that is to be presented to the given eye. In an example, the at least one graphical element may be a two-dimensional (2D) user interface (UI) element. Such a 2D UI element could pertain to, for example, a virtual navigation tool, a virtual gadget, a virtual message, a virtual entity, a virtual entertainment media, a virtual information, or similar. The at least one graphical element could alternatively be a 3D graphical element.

Throughout the present disclosure, the term "virtual depth" refers to a perceived depth of the at least one graphical element in a 3D viewing space. In other words, a given virtual depth is understood to be a perceived depth at which the at least one graphical element appears to the given of the at least one user. Such a perception is achieved by a horizontal parallax effect created by the autostereoscopic display, which is well-known in the art.

The at least one spatial anchor is positioned at the at least one predefined position on the frustum cross-section. In this regard, the at least one processor digitally places the at least one spatial anchor at the at least one predefined position. The at least one spatial anchor serves as a reference point for positioning the at least one graphical element on the frustum cross-section. This ensures that the at least one graphical element is optimally (namely, highly accurately and precisely) positioned in the image for improved visibility and usability relative to the given eye.

Throughout the present disclosure, the term "spatial anchor" refers to a computer-generated object that is positioned on the frustum cross-section and is served as a reference point for positioning the at least one graphical element on the frustum cross-section. In other words, the at least one graphical element is positioned relative to the at least one spatial anchor. The at least one spatial anchor could, for example, be a virtual point, a virtual shape, a virtual line, or similar. The at least one spatial anchor could be a 2D spatial anchor or a 3D spatial anchor. In practical applications, the at least one spatial anchor may also include orientation information to ensure that the at least one graphical element appears correctly rotated and aligned towards the given user. In this regard, the at least one spatial anchor has a position and optionally also an orientation. The orientation of the at least one spatial anchor can be any one of: a world-oriented orientation, a facing-the-viewer orientation, an orientation aligned with a curvature of an imaginary surface that is positioned at a native optical distance. This flexibility in orientation ensures that the at least one graphical element can be positioned and aligned appropriately for different use cases. It is to be understood that the at least one spatial anchor is not visually presented to the given eye like the at least one graphical element, but is instead utilised solely as a reference for determining the position of the at least one graphical element.

Optionally, the at least one predefined position includes at least one of: a centre of the frustum cross-section, at least one corner of the frustum cross-section, a centre of at least one edge of the frustum cross-section. Positioning the at least one spatial anchor at the centre of the frustum cross-section ensures a balanced visibility of the at least one graphical element across different eye positions (namely, viewing positions) of the at least one user. Positioning the at least one spatial anchor at the at least one corner of the frustum cross-section is beneficial in cases where the at least one graphical element (for example, pertaining to a virtual notification) is to be presented in a peripheral region of the given image, whilst maintaining its visibility to the given eye. Positioning the at least one spatial anchor at the centre of the at least one edge of the frustum cross-section is beneficial in cases where the at least one graphical element is to be kept unobtrusive, whilst maintaining its visibility to the given eye.

It will be appreciated that as the frustum cross-section is determined at the given virtual depth relative to the given eye (as discussed earlier), the at least one processor can further utilise eye height data (optionally, collected using the tracker) to position the at least one spatial anchor along a vertical direction within the frustum cross-section. This ensures that the at least one graphical element appears at a consistent vertical level for users of different heights, in a multi-user scenario. For example, the at least one processor can adjust a vertical positioning of a given spatial anchor, for example, such as a central anchor (namely, when the given spatial anchor is being positioned at the centre of the frustum cross-section) to account for variations in eye heights between the users.

In this example, the central anchor may not necessarily align with a geometric centre of the perceived autostereoscopic display, but is instead positioned in a manner that the at least one graphical element remains correctly positioned and visible to the users, regardless of variations in the eye heights or viewing positions.

The position for the at least one graphical element is determined on the frustum cross-section relative to the at least one spatial anchor. In this regard, the at least one processor determines a relative position of the at least one graphical element with respect to the at least one spatial anchor (whose position is already known). Since the at least one predefined position of the at least one spatial anchor and the given virtual depth at which the at least one graphical element is to be presented are known, the at least one processor can precisely determine where the at least one graphical element is to be positioned on the frustum cross-section. This is beneficial because using the at least one spatial anchor as the reference point, the at least one graphical element is positioned such that it remains visible and unobstructed to the given eye, regardless of variations in user heights, head movements, or viewing angles, thereby eliminating prior art issues such as misalignment, partial obstructions, and visual strain caused due to improper placement of graphical elements.

Optionally, when the at least one predefined position includes the centre of the frustum cross-section, and when determining the position for the at least one graphical element, the at least one processor is configured to: identify a containing region that is positioned relative to the centre of the frustum cross-section, the containing region having a size smaller than a size of the frustum cross-section; and determine the position for the at least one graphical element within the containing region.

The given image is generated for presenting the at least one graphical element to the given eye, the at least one graphical element being positioned at the determined position. Advantageously, the at least one graphical element is perceived by the at least one user to be at the given virtual depth, and the at least one graphical element remains always clearly visible (and usable) within the user's field of view, regardless of changes in the user's head position, the eye heights, or viewing directions of the given eye. This is made possible due to a synergistic effect of positioning the at least one spatial anchor on the frustum cross-section, and then utilising it for determining the position for the at least one graphical element on the frustum cross-section, as discussed earlier.

Optionally, the at least one processor is configured to generate an image segment of the given image, the image segment representing the at least one graphical element at the determined position and the given virtual depth. It will be appreciated that said image segment is displayed to the at least one user at a given 3D position in a field of view of the at least one user. For example, when the system is implemented in a vehicle (such as a car) in which a user is present, the image segment may be displayed to the user at a 3D position towards on a middle of a right-side portion of a field of view of the user. It will also be appreciated that where there are multiple graphical elements, multiple image segments of the given image will be generated in a similar manner. Additionally, optionally, the at least one processor is configured to generate a remainder of the given image (namely, a background of the given image excluding the image segment) as empty and transparent. This ensures that only the at least one graphical element is visible at the determined position and the given virtual depth, while the remainder of the given image does not obstruct the user's view of the real-world environment. The at least one processor can perform this step by assigning alpha values (namely, transparency values) to pixels of the remainder of the given image, setting them to fully transparent, while preserving an opacity of the image segment that represents the at least one graphical element. This can be performed using any suitable well-known image compositing technique.

Optionally, when the system is implemented in the vehicle, and the optical combiner is integrated into a windshield of the vehicle, the at least one processor is configured to display the given image via the autostereoscopic display for producing a synthetic light field augmenting a real-world light field of the real-world environment incoming via the windshield of the vehicle, wherein the optical combiner is employed to reflect a given part of the synthetic light field towards the given eye, presenting a given virtual image to the given eye, whilst optically combining the given part of the synthetic light field with the real-world light field.

It will be appreciated that it may not be necessary to perform the aforesaid processing steps for each of two eyes of the at least one user. In an implementation, the aforesaid processing steps can be performed for one of the two eyes of the at least one user, and for another of the two eyes of the at least one user, the at least one processor can approximate the positioning of the at least one spatial anchor and positioning of the at least one graphical element, based at least on an interpupillary distance of the at least one user. In this way, the at least one processor can generate another image corresponding to the another of the two eyes of the at least one user, and then can generate a light field image from the given image and the another image, to present the at least one graphical element to the two eyes of the at least one user at the given virtual depth, in an autostereoscopic manner.

Alternative to the aforesaid implementation, all the aforesaid processing steps can also be performed for the another of the two eyes (namely, another eye) of the at least one user. Optionally, in this regard, the at least one processor is configured to:

determine a relative position of another eye of the at least one user with respect to the semi-reflective surface, using the tracker;
identify another reflection region on the semi-reflective surface from which the light emitted by the light-emitting surface is reflected toward the another eye, based on: (i) the relative position of the another eye with respect to the semi-reflective surface, (ii) the position, orientation, size and curvature of the semi-reflective surface, and (iii) the position, orientation, size and curvature of the light-emitting surface;
determine another 3D view frustum corresponding to the another eye, based on the another reflection region on the semi-reflective surface, and the relative position of the another eye with respect to the semi-reflective surface;
compute a common 3D view frustum as an intersection of the given 3D view frustum and the another 3D view frustum;
for the given virtual depth at which the at least one graphical element is to be presented, determine at least one frustum cross-section of the common 3D view frustum at the given virtual depth relative to at least one of: the given eye, the another eye;
position at least one spatial anchor at: at least one predefined position on the at least one frustum cross-section;
determine a position for the at least one graphical element on the at least one frustum cross-section relative to the at least one spatial anchor;
generate another image for presenting the at least one graphical element to the another eye, positioning the at least one graphical element at the determined position; and
generate a light field image from the given image and the another image, to present the at least one graphical element to the given eye and the another eye of the at least one user at the given virtual depth.

A technical benefit of this implementation is that it allows for presenting the at least one graphical element in an autostereoscopic manner, thereby enhancing depth perception for the at least one user and providing a natural and immersive viewing experience to the at least one user. This is made possible because the step of computing the common 3D view frustum results in determining a volume in the 3D space that is visible to both the given eye and the another eye via the semi-reflective surface. Thus, when the at least one frustum cross-section of the common 3D view frustum is used for positioning the at least one spatial anchor, it is ensured that the at least one graphical element would be consistently visible to both the given eye and the another eye.

In some cases, the at least one frustum cross-section comprises two frustum cross-sections wherein one of the two frustum cross-sections corresponds to the given eye and another of the two frustum cross-section correspond to the another eye. This is because both the given eye and the another eye would be typically presented slightly offset images. In such cases, corresponding spatial anchor(s) (namely, separate spatial anchor(s)) can be positioned on both of the two (separate) frustum cross-sections. In other cases, the at least one frustum cross-section comprises a single frustum cross-section for both the given eye and the another eye of the at least one user. In such cases, the single frustum cross-section is utilised for positioning same spatial anchor(s) for both the given eye and the another eye. The at least one graphical element can then be positioned on separate images (namely, the given image and the another image for respective eyes) relative to the same spatial anchor(s). It is to be noted that in such cases, errors can potentially be avoided by keeping the at least one graphical element, for example, within a boundary formed by spatial anchors that are positioned on corners of the single frustum cross-section. This is possible because both the given eye and the another eye would be presented the separate images which are typically only slightly offset from each other. It is to be understood that the at least one frustum cross-section (of the common 3D view frustum) overlaps with the frustum cross-section of the given 3D view frustum.

It will be appreciated that spatial anchors are positioned based on a well-defined 3D coordinate space, and the same spatial anchors are preferably utilised for both the given eye and the another eye. The at least one processor selects a 3D position of a given spatial anchor such that the at least one graphical element positioned relative to the given spatial anchor is visible to both the given eye and the another eye. This selection takes into account the limitations of the autostereoscopic display, the position of the semi-reflective surface, and the relative positions of the given eye and the another eye. By ensuring that the same spatial anchors are shared and appropriately positioned on the at least one frustum cross-section, the at least one processor guarantees consistent visibility of the at least one graphical element across both the eyes of the at least one user, whilst maintaining alignment within the common 3D view frustum.

Optionally, upon generating the light field image, the at least one processor is configured to display the light field image via the autostereoscopic display to produce a synthetic light field augmenting a real-world light field of the real-world environment, wherein the optical combiner is employed to reflect a first part and a second part of the synthetic light field towards the given eye and the another eye of the at least one user, presenting a first virtual image to the given eye and a second virtual image to the another eye, respectively, whilst optically combining the first part and the second part of the synthetic light field with the real-world light field.

Moreover, optionally, the at least one user is a plurality of users, wherein the at least one processor is configured to:
determine respective relative positions of eyes of each individual one of the plurality of users with respect to the semi-reflective surface;
identify respective reflection regions on the semi-reflective surface from which the light emitted by the light-emitting surface is reflected toward the eyes of each individual one of the plurality of users, based on: (i) the respective relative positions of the eyes with respect to the semi-reflective surface, (ii) the position, orientation, size and curvature of the semi-reflective surface, and (iii) the position, orientation, size and curvature of the light-emitting surface;
determine respective 3D view frustums corresponding to the eyes of each individual one of the plurality of users, based on the respective reflection regions on the semi-reflective surface, and the respective relative positions of the eyes with respect to the semi-reflective surface;
compute a common 3D view frustum as an intersection of the respective 3D view frustums corresponding to the eyes of each individual one of the plurality of users;
for the given virtual depth at which the at least one graphical element is to be presented, determine respective frustum cross-sections of the common 3D view frustum at the given virtual depth relative to the eyes of each individual one of the plurality of users;
position at least one corresponding spatial anchor at: at least one predefined position on the respective frustum cross-sections;
determine respective positions for the at least one graphical element on the respective frustum cross-sections relative to the at least one corresponding spatial anchor;
generate respective images for presenting the at least one graphical element to the eyes of each individual one of the plurality of users, positioning the at least one graphical element at the respective positions; and
generate a light field image from the respective images, to present the at least one graphical element to the eyes of each individual one of the plurality of users at the given virtual depth.

This implementation provides significant technical benefits by enabling the system and the method to support shared, multi-user displays. By determining the respective 3D view frustums for the eyes of each individual one of the plurality of users and computing the common 3D view frustum, the at least one processor ensures that the at least one graphical element is visible to all users simultaneously. This adaptability allows the autostereoscopic display to accommodate multiple users with varying relative positions of their eyes with respect to the semi-reflective surface, ensuring consistent visibility and usability for each of the plurality of users. Additionally, by positioning the at least one corresponding spatial anchor on the respective frustum cross-sections, the at least one processor ensures that the at least one graphical element is accurately aligned for each user amongst the plurality of users (as different sets of spatial anchors can be utilised per user to render the at least one graphical element), whilst maintaining a visual consistency between a left eye and a right eye of said user. This enhances a flexibility of the system, making it suitable for collaborative environments or shared displays, while maintaining precise alignment and visibility of the at least one graphical element for all users. It is to be understood that as the eyes of different users are at different relative positions with respect to the semi-reflective surface, the respective frustum cross-sections are determined for each user separately.

In some implementations, the system and the method can be configured to account for a 3D volume (commonly referred to as an "eye box") representing expected range of positions where the head of the at least one user is likely to be located. This approach allows the at least one processor to determine a common 3D view frustum that encompasses a visible volume from all possible eye positions within the eye box, rather than continuously updating spatial anchors based on real-time head movements. Optionally, in this regard, the at least one processor is configured to:
determine a 3D volume within which a head of the at least one user is likely to be present;
identify respective reflection regions on the semi-reflective surface from which the light emitted by the light-emitting surface is reflected toward different points on a surface of the 3D volume, based on: (i) respective relative positions of the different points with respect to the semi-reflective surface, (ii) the position, orientation, size and curvature of the semi-reflective surface, and (iii) the position, orientation, size and curvature of the light-emitting surface;
determine respective 3D view frustums corresponding to the different points, based on the respective reflection regions on the semi-reflective surface, and the respective relative positions of the different points with respect to the semi-reflective surface;
compute a common 3D view frustum as an intersection of the respective 3D view frustums corresponding to the different points;

for another given virtual depth at which at least one another graphical element is to be presented, determine another frustum cross-section of the common 3D view frustum at the another given virtual depth relative to the given eye of the at least one user;

position at least one another spatial anchor at: at least one another predefined position on the another frustum cross-section;

determine a position for the at least one another graphical element on the another frustum cross-section relative to the at least one another spatial anchor; and generate the given image for presenting the at least one another graphical element also to the given eye, positioning the at least one another graphical element at the determined position.

A technical benefit of this implementation is that it allows for presenting the at least one graphical element in a manner that it remains visible from all possible eye positions of the at least one user within the determined 3D volume (namely, an eye box or an eye sphere). This is made possible because the intersection of the respective 3D view frustums results in determining a common volume that is visible from all possible viewing positions of the given eye within the 3D volume (namely, the common 3D view frustum). Each 3D view frustum corresponds to a specific point within the 3D volume, and its boundaries define a given volume visible to the given eye located at that specific point. This guarantees that the at least one graphical element, when positioned within this common 3D view frustum, remains visible regardless of the user's head movement or any position within the 3D volume. Additionally, it eliminates a need for continuously updating the positioning of the at least one spatial anchor (and the positioning of the at least one graphical element accordingly) as a position of the head of the at least one user changes. This enables in reducing potential distractions for the user (i.e., by minimising unnecessary system adjustments user comfort can be improved), while still maintaining optimal visibility and usability of the autostereoscopic display.

It will be appreciated that the different points on the surface of the 3D volume could be in a form of at least one of: corners, centre of edges, in case of a polyhedron. Alternatively, the different points on the surface of the 3D volume could be in a form of a point on the surface in case of a sphere. Moreover, in some implementations, the another given virtual depth is same as the given virtual depth corresponding to the at least one graphical element. In other implementations, the another given virtual depth is different from the given virtual depth.

The term "three-dimensional volume" refers to a portion of the 3D space in which the head of the at least one user is likely to be present. In other words, the 3D volume can be understood to be a volume in which each point indicates a realistically possible (namely, a physically possible) location of the head of the at least one user. The 3D volume need not necessarily have a definite shape and/or size, and thus could have any shape and/or size.

Optionally, when the system is implemented in the vehicle, the at least one processor is configured to determine the 3D volume, based on a current setting of at least one adjustable seat parameter of the vehicle. Optionally, in this regard, the at least one adjustable seat parameter comprises at least one of: a position of a seat of the vehicle on which the at least one user is sitting, an orientation of a backrest of the seat, a height of a lower part of the seat from a floor of the vehicle, an orientation of the lower part of the seat, a position of a neck support of the seat, an orientation of the neck support, a curvature of a lumbar support of the seat. It will be appreciated that the current setting of the at least one adjustable seat parameter allows the at least one processor to ascertain a comprehensive understanding of a seating posture of the user within the vehicle (namely, a user's spatial relationship within the vehicle). Such a comprehensive understanding allows the at least one processor to accurately estimate likely positions of the user's head within a 3D space of the vehicle, in order to determine the 3D volume. As an example, a combination of two or more adjustable seat parameters may provide a spatial context for a position of the user within the vehicle, which facilitates in ascertaining a reference frame for estimating locations of the head. As another example, some adjustable seat parameters, for example, such as the curvature of the lumbar support curvature and the orientation of the neck support may directly influence a user's posture and a head position within the vehicle, which facilitates in ascertaining likely locations of the head within a vehicle space. As the user may change his/her seating posture or may adjust the at least one adjustable seat parameters, the at least one processor would continuously update its understanding of the user's spatial relationship within the vehicle. Such a dynamic adaptation potentially ensures accurate and responsive determination of the 3D volume where the user's head is likely to be present.

Furthermore, optionally, a shape of the light-emitting surface is rectangular, and the semi-reflective surface is curved, wherein the at least one processor is configured to:

determine when a shape of the frustum cross-section is non-rectangular;

determine a maximal rectangular region of the frustum cross-section that is aligned with an X-axis of an image plane of the autostereoscopic display; and when determining the position for the at least one graphical element, determine the position for the at least one graphical element within the maximal rectangular region.

A technical benefit of this is that it ensures adaptability to curved semi-reflective surfaces of optical combiners and variable viewing angles by determining the maximal rectangular region within the frustum cross-section when the shape of the frustum cross-section is non-rectangular. This allows the at least one processor to position the at least one graphical element within a well-defined, horizontally-levelled rectangular area (namely, the maximal rectangular region), ensuring consistent visibility and usability of the at least one graphical element. By aligning the maximal rectangular region with the X-axis of the image plane of the autostereoscopic display, the at least one processor simplifies the placement of the at least one graphical element, in cases where the frustum cross-section is distorted due to the curvature of the semi-reflective surface. This approach enhances compatibility with complex geometries and also ensures that the at least one graphical element remains optimally positioned for the given eye. It will be appreciated that aligning the orientation of the at least one graphical element with contours of the semi-reflective surface may be desirable for certain design preferences. For example, for presenting wide-angle view content, aligning the at least one graphical element with a curved surface can provide an immersive viewing experience by wrapping it around a user's field of vision. This approach is similar to an effect achieved by wide-angle curved monitors, where a curvature enhances the viewing experience of the user.

It will be appreciated that when the semi-reflective surface is curved, the shape of the frustum cross-section is non-rectangular (namely, distorted). Since dimensions of the frustum cross-section are well-known to the at least one processor, it can easily determine when the shape of the frustum cross-section is non-rectangular. For example, the at least one processor can evaluate boundaries of the frustum cross-section and compares them to typical characteristics of a rectangle, such as having four straight edges and right angles at its corners. If the boundaries deviate from these typical characteristics, such as having curved edges or non-right angles, the at least one processor can identify the shape of the frustum cross-section to be non-rectangular. It will also be appreciated that the light-emitting surface of the autostereoscopic display can also be curved, and the shape of the frustum cross-section would be irregular/distorted (for example, such as non-rectangular). In such a scenario also, the at least one processor can perform similar processing steps as above, for determining the maximal rectangular region of the frustum cross-section and then positioning the at least one graphical element within the maximal rectangular region. It is to be understood that when the semi-reflective surface and/or the light-emitting surface is/are curved, the given image is generated (slightly) distorted to compensate for geometric aberrations arising due to a curvature of the semi-reflective surface and/or the light-emitting surface.

When determining the maximal rectangular region, the at least one processor can employ well-known rectangular fitting techniques. One such rectangular fitting technique may involve identifying a largest inscribed rectangle within the boundaries of the frustum cross-section, ensuring that said rectangle is fully contained within a non-rectangular frustum cross-section. Another such rectangular fitting technique may involve projecting edges of the frustum cross-section onto the X-axis of the image plane of the autostereoscopic display and calculating a largest rectangle that aligns horizontally with the X-axis. Additionally, the at least one processor can utilise well-known shape optimisation algorithms to maximize an area of the rectangle, while ensuring it remains within the non-rectangular frustum cross-section. It is to be understood that once the maximal rectangular region is determined, the position for the at least one graphical element is determined such that positional coordinates for the at least one graphical element lie within a boundary formed by coordinates of corners of the maximal rectangular region. In an example, positioning the graphical elements on a curved surface can be achieved by positioning the graphical elements (or their portions) at different virtual depths. It will be appreciated that when the semi-reflective surface is curved, a curvature of the semi-reflective surface can be in one or more directions, and have varying curvature radii in different directions and also different curvature at different points on the semi-reflective surface. Optionally, the given virtual depth lies within a predefined threshold range from a native optical distance of the autostereoscopic display from the given eye along a viewing direction of the given eye. Technical benefits of this are multifold. First, when the at least one spatial anchor is positioned at the native optical distance, the at least one graphical element (for example, such as an UI element) appears to be present at a depth where optics of the autostereoscopic display would naturally focus. Particularly, in multiscopic displays, positioning the at least one spatial anchor at this depth ensures a natural viewing experience for the at least one user. Second, when the at least one spatial anchor is positioned at the native optical distance, there is minimal mismatch between vergence (a depth at which the eyes converge) and accommodation (a depth at which the eyes focus) as the at least one graphical element appears at a depth that aligns with a natural focal plane of the given eye. Third, when the at least one spatial anchor is positioned at the native optical distance, an eye strain caused by conflicting depth cues is reduced, making the HUD or the UI more comfortable to view over long periods. For example, in an automotive HUD using an image-based autostereoscopic display, when the native optical distance is 2 meters, graphical elements such as a speedometer or a navigation marker can be anchored at a virtual depth of 2 meters. This prevents discomfort caused by forcing the eyes to converge on a graphical element at 2 meters, while focussing at a different virtual depth (for example, 5 meters).

The term "native optical distance" of the autostereoscopic display refers to a sum of a first distance between the given eye and the semi-reflective surface and a second distance between the semi-reflective surface and the autostereoscopic display, both distances being measured along the viewing direction of the given eye. It will be appreciated that the given virtual depth need not be exactly the same as the native optical distance because the human visual system can tolerate small differences between the vergence and the accommodation. This tolerance allows the at least one graphical element to be positioned at the given virtual depth that lies within the predefined threshold range from the native optical distance, rather than requiring an exact match. The predefined threshold range takes care of the fact the given virtual depth is close enough to the native optical distance to minimise any mismatch between vergence and accommodation. This provides flexibility in positioning the at least one graphical element while still maintaining a comfortable and natural viewing experience for the given eye. In other words, by allowing a small range of deviation in the given virtual depth, the system can account for practical constraints, such as a geometry of the semi-reflective surface or a positioning of the autostereoscopic display, without causing significant visual discomfort or strain. In an example, for image-based multiscopic displays, the at least one graphical element may be presented at the native optical distance. Optionally, the predefined threshold range lies in a range of 1 centimeter to 10 centimeters from the native optical distance.

Optionally, the semi-reflective surface is curved, the light-emitting surface is optionally curved, and wherein the at least one processor is configured to:
  determine an orientation of a 3D shape of the at least one spatial anchor, based on a curvature of an imaginary surface that is positioned at a native optical distance of the autostereoscopic display from the given eye along the viewing direction of the given eye;
  determine an orientation of the at least one graphical element, based on the orientation of the 3D shape of the at least one spatial anchor; and
  when generating the given image, orient the at least one graphical element according to the determined orientation.

A technical benefit of this is that it ensures that the at least one graphical element is correctly aligned with the curvature of the imaginary surface positioned at the native optical distance of the autostereoscopic display from the given eye. By determining the orientation of the 3D shape of the at least one spatial anchor based on the curvature of the imaginary surface, the at least one processor ensures that the at least one graphical element is accurately aligned with the native optical distance. This ensures that only a local curvature of the imaginary surface is taken into account. Due to this, graphical distortions are prevented by ensuring accurate alignment of the at least one graphical element. Additionally, by determining the orientation of the at least one graphical element based on the orientation of the 3D shape of the at least one spatial anchor, the at least one processor improves optical consistency when rendering the at least one graphical content. This ensures that the at least one graphical element appears natural and distortion-free to the given eye, even when the semi-reflective surface (and optionally, the light-emitting surface) has varying curvatures. Together, these technical benefits enhance overall visual quality and usability of the at least one graphical element for the at least one user.

It will be appreciated that the at least one processor can utilise the determined orientation of the 3D shape of the at least one spatial anchor as a reference to align the at least one graphical element accordingly, ensuring that its orientation matches the curvature of the imaginary surface at the native optical distance. This ensures that the at least one graphical element is displayed at a correct angle and has an intended alignment, preventing distortions and maintaining consistency with a geometry of the imaginary surface. It is to be noted that the native optical distance of different portions of the light-emitting surface is different, and depends on the curvature of corresponding portions of the semi-reflective surface (from which the light emitted by said portions of the light-emitting surface is reflected toward the given eye). This is because the curvature of the corresponding portions of the semi-reflective surface affects/alters an optical path of the light reflected toward the given eye. This signifies that the orientation of the 3D shape of the at least one spatial anchor, which corresponds to the curvature of the imaginary surface at the native optical distance, may also account for these variations in the native optical distance.

In some implementations, the at least one spatial anchor can be represented as a simple 3D point in space without orientation. In other implementations (as described hereinabove), the at least one spatial anchor can represent a 3D pose, for example, with a depth axis (namely, Z-axis) extending away from the at least one user, a Y-axis pointing upwards, and an X-axis pointing towards a right side from the at least one user. In this regard, the 3D pose of the at least one spatial anchor can be aligned such that the X-axis and Y-axis are oriented along the imaginary surface at the native optical distance. This alignment beneficially ensures that any graphical element with a non-zero size positioned relative to the at least one spatial anchor is aligned with the native optical distance even with a curved semi-reflective surface, ensuring accurate alignment and usability of said graphical element, except for deviations caused by a higher-order curvature of the imaginary surface.

In some implementations, the at least one processor is configured to:
 determine a first frustum cross-section and a second frustum cross-section of the given 3D view frustum at a first virtual depth and a second virtual depth relative to the given eye, wherein at least one of: the first virtual depth, the second virtual depth is different from the given virtual depth;
 determine a bounding volume enclosed between the first frustum cross-section and the second frustum cross-section;
 position a plurality of spatial anchors at a plurality of predefined positions on the bounding volume;
 determine a position for at least one another graphical element within the bounding volume relative to the plurality of spatial anchors; and
 generate the given image for presenting the at least one another graphical element also to the given eye, positioning the at least one another graphical element at the determined position.

Instead of positioning a given spatial anchor on a given frustum cross-section (as discussed earlier), the given spatial anchor can instead be positioned at a given predefined position on the bounding volume enclosed between the first frustum cross-section and the second frustum cross-section. A technical benefit of this is that it enables depth-aware positioning of the at least one another graphical element within the bounding volume. In other words, by positioning the plurality of spatial anchors for a viewable volume, rather than just a viewable area (i.e., the given frustum cross-section), the at least one processor ensures that 3D graphical objects can be accurately positioned within the bounding volume (in the given image), maintaining their visibility to the given eye of the at least one user, and improving an overall viewing experience of the at least one user.

It will be appreciated that the first virtual depth and the second virtual depth could be selected as a lower bound and an upper bound of virtual depths within which the at least one another graphical element is to be presented. This defines a controlled depth range within which the at least one another graphical element can be safely positioned, thereby ensuring that the at least one another graphical element remains visible to the given eye and does not extend beyond the bounding volume. It will also be appreciated that the plurality of predefined positions on the bounding volume include at least one of: corners of the bounding volume, centres of edges of the bounding volume, centroids of surfaces of the bounding volume, a centroid of the bounding volume. It is to be noted that a shape of the bounding volume depends on shapes of the first frustum cross-section and the second frustum cross-section. For example, when the first frustum cross-section (at the first virtual depth) is a rectangle and the second frustum cross-section (at the second virtual depth) is a trapezoid due to the curvature of the semi-reflective surface, the bounding volume may take a shape of a 3D trapezoidal prism.

In some implementations, the autostereoscopic display comprises a plurality of sub-display units, the light-emitting surface being formed by respective light-emitting surfaces of the plurality of sub-display units, wherein the at least one processor is configured to perform the step of identifying respective reflection regions, the step of determining respective 3D view frustums, the step of determining respective frustum cross-sections, the step of positioning at least one corresponding spatial anchor, the step of determining corresponding positions of the at least one graphical element, and the step of generating respective images, for each individual one of the plurality of sub-display units.

This implementation is particularly beneficial when the system is implemented in the vehicle, as it allows for a simple, yet effective integration of the autostereoscopic display according to contours of a dashboard of the vehicle. It will be appreciated that the dashboard may have certain portions whose curvature is so sharp that it may become difficult to manufacture the light-emitting surface to match such a sharp curvature. Typically, the contours of the dashboard have outward-bulging curved surface, namely a convex-like surface. Thus, light emitted by a portion of the light-emitting surface that has a sharp curvature would cause light rays to diverge drastically. This may lead to visual artefacts. Such visual artefacts can be prevented by implementing the autostereoscopic display using the plurality of sub-display units. Optionally, the plurality of sub-display units are arranged in a tiled manner. It will be appreciated that the at least one processor performs the aforementioned processing steps for each sub-display unit in a similar manner, as described earlier in detail.

Optionally, the at least one processor is configured to repeat the step of determining the relative position of the given eye, the step of identifying the given reflection region, the step of determining the given 3D view frustum, the step of determining the frustum cross-section, the step of positioning the at least one spatial anchor, the step of determining the position of the at least one graphical element, and the step of generating the given image, during a given time period, wherein the position of the at least one graphical element is updated at a rate lower than a predefined threshold rate.

In this regard, when the position of the at least one spatial anchor changes due to changes in the relative position of the given eye, the position of the at least one graphical element would also change accordingly. However, by ensuring that the position of the at least one graphical element is updated at the rate lower than the predefined threshold rate during the given time period, an abrupt or excessive motion of the at least one graphical element is prevented. A technical benefit of this is that it prevents jitter or instability in the at least one graphical element's movement, ensuring a stable and visually comfortable experience for the at least one user. Additionally, the predefined threshold rate is selected to minimise perceptual discomfort, such as motion sickness or visual fatigue, by avoiding rapid or erratic movements of the at least one graphical element. This implementation is particularly beneficial for presenting static graphical elements. In this case, applying smoothing techniques or easing animations (similar to how a spring moves when stretched or compressed) makes the system feel more user-friendly and less distracting, as the static graphical elements do not appear clingy or overly responsive to head movements during the given time period (for example, during vehicular acceleration when the system is implemented in the vehicle). All such techniques are well-known in the art. In case of dynamic graphical elements, such as animated objects, the implementation ensures smooth pursuit by providing a controlled and natural update path, enhancing the usability of the autostereoscopic display. Optionally, the predefined threshold rate lies in a range of 0.5 degrees per second to 5 degrees per second.

For illustration purposes only, there will now be described how various components of the system can be implemented. The at least one processor controls an overall operation of the system. The at least one processor is communicably coupled to the tracker and the autostereoscopic display. Optionally, the at least one processor is implemented as a processor of the autostereoscopic display. Alternatively, optionally, the at least one processor is implemented as a processor of a computing device that is communicably coupled to the autostereoscopic display. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "tracker" refers to a specialised equipment for detecting and/or tracking at least a position of a given eye of a given user. Optionally, the tracker is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a ToF camera, a LIDAR camera, an RGB-D camera, a laser rangefinder, a stereo camera, a plenoptic camera, a ranging camera, a SONAR camera. It will be appreciated that any combination of various different types of cameras (namely, the at least one visible-light camera, the at least one IR camera, the at least one depth camera) may be utilised in the tracker. When different types of images captured by the various different types of tracking cameras are utilised, the position of the given eye can be determined highly accurately, as results obtained from one type of image can be used to refine results obtained from another type of image. Herein, the different types of images constitute the tracking data collected by the tracker, and may be in the form of at least one of: visible-light images, IR images, depth images. It will be appreciated that the tracker tracks both eyes of the at least one user with a significantly high accuracy and precision, such that an error in determining the relative location may, for example, be minimised to within a tolerance range of approximately (+/−) 8 millimetres.

In some implementations, the relative location of the given eye of the at least one user with respect to the semi-reflective surface can be determined based on a typical position of the given eye of the at least one user for the system. In this regard, a default, pre-known position may be considered as the typical position of the given eye. In other implementations, when the system is implemented as an HUD inside the vehicle, the relative location of the given eye can be determined, based on a current setting of the at least one adjustable seat parameter of the seat of the vehicle on which the at least one user is sitting. It will be appreciated that the at least one adjustable seat parameter is approximately indicative of a current position of a head of the at least one user inside the vehicle, and thus, could be beneficially utilised for determining the relative location of the given eye of the at least one user with respect to the semi-reflective surface.

In some implementations, the autostereoscopic display can be implemented as a light field display unit. Pursuant to embodiments of the present disclosure, different types of light field display units can be implemented. For example, the light field display unit can be any one of: a hogel-based light field display unit, a lenticular array based light field display unit, a parallax-barrier based light field display unit. The light field display unit could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display.

As mentioned earlier, in case of a 3D display unit (namely, the light field display unit), the light field image is generated by utilising the given image and the another image, which are generated for presenting the at least one graphical element to the given eye and the another eye, respectively.

In a case where the at least one user comprises a plurality of users, there would be a corresponding pair of a given image and another image for each of the plurality of users. The light field image may be understood to be a two-dimensional (2D) image comprising a plurality of pixels, wherein a first set of pixels from amongst the plurality of pixels is responsible for generating a first part of the synthetic light field that corresponds to the given eye, and a second set of pixels from amongst the plurality of pixels is responsible for generating a second part of the synthetic light field that corresponds to the another eye. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal field of view of the light field image, wherein each vertical stripe comprises one or more lines of pixels. This is because humans perceive depth mainly based on horizontal binocular parallax. Thus, in this way, the light field image would be considerably different as compared to a conventional 2D image that is displayed via conventional 2D displays, because the same light field image comprises visual information corresponding to the given eye as well as the another eye of the at least one user.

Throughout the present disclosure, the term "synthetic light field" refers to a light field that is produced (namely, generated) synthetically by the light field display unit, while the term "real-world light field" refers to a light field emanating from the real-world environment in which the at least one user is present. It will be appreciated that in case of the real-world light field, light from, for example, a natural light source (such as the Sun) and/or an artificial light source (such as a lamp, a bulb, a tubelight, or similar), are reflected off real-world objects (or their portions) to be incident towards the eyes of the at least one user. In this way, visual information (for example, such as colour information, optical depth information, and the like) pertaining to said real-world objects is typically perceived by the given eye and the another eye. On the other hand, in case of the synthetic light field, light emanating from the light field display unit, upon reflecting off the optical combiner, is incident on the given eye and the another eye of the at least one user. In this way, visual information pertaining to the at least one virtual object can be perceived by the given eye and the another eye.

Furthermore, optionally, when generating the light field image, the at least one processor is configured to determine, within the light field image, a position of a given pixel of the first set and a position of a given pixel of the second set that correspond to a given synthetic 3D point, based on an interpupillary distance between the eyes of the at least one user and a given virtual depth at which the given synthetic 3D point is to be displayed. This allows for presenting the given synthetic 3D point at said given virtual depth, by utilising binocular disparity.

Throughout the present disclosure, the term "optical combiner" refers to a specialised equipment that is capable of reflecting a corresponding part of the synthetic light field towards a given eye of the at least one user, whilst optically combining said part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to the image plane of the autostereoscopic display unit lies in a range of 10 degrees to 75 degrees.

The present disclosure also relates to the method as described above. Various embodiments and variants disclosed above, with respect to the aforementioned first aspect, apply mutatis mutandis to the method.

Optionally, the method further comprises:
determining a relative position of another eye of the at least one user with respect to the semi-reflective surface, using the tracker;
identifying another reflection region on the semi-reflective surface from which the light emitted by the light-emitting surface is reflected toward the another eye, based on: (i) the relative position of the another eye with respect to the semi-reflective surface, (ii) the position, orientation, size and curvature of the semi-reflective surface, and (iii) the position, orientation, size and curvature of the light-emitting surface;
determining another 3D view frustum corresponding to the another eye, based on the another reflection region on the semi-reflective surface, and the relative position of the another eye with respect to the semi-reflective surface;
computing a common 3D view frustum as an intersection of the given 3D view frustum and the another 3D view frustum;
for the given virtual depth at which the at least one graphical element is to be presented, determining at least one frustum cross-section of the common 3D view frustum at the given virtual depth relative to at least one of: the given eye, the another eye;
positioning at least one spatial anchor at: at least one predefined position on the at least one frustum cross-section;
determining a position for the at least one graphical element on the at least one frustum cross-section relative to the at least one spatial anchor;
generating another image for presenting the at least one graphical element to the another eye, positioning the at least one graphical element at the determined position; and
generating a light field image from the given image and the another image, to present the at least one graphical element to the given eye and the another eye of the at least one user at the given virtual depth.

Moreover, optionally, the at least one user is a plurality of users, wherein the method further comprises:
determining respective relative positions of eyes of each individual one of the plurality of users with respect to the semi-reflective surface;
identifying respective reflection regions on the semi-reflective surface from which the light emitted by the light-emitting surface is reflected toward the eyes of each individual one of the plurality of users, based on: (i) the respective relative positions of the eyes with respect to the semi-reflective surface, (ii) the position, orientation, size and curvature of the semi-reflective surface, and (iii) the position, orientation, size and curvature of the light-emitting surface;
determining respective 3D view frustums corresponding to the eyes of each individual one of the plurality of users, based on the respective reflection regions on the semi-reflective surface, and the respective relative positions of the eyes with respect to the semi-reflective surface;

computing a common 3D view frustum as an intersection of the respective 3D view frustums corresponding to the eyes of each individual one of the plurality of users;

for the given virtual depth at which the at least one graphical element is to be presented, determining respective frustum cross-sections of the common 3D view frustum at the given virtual depth relative to the eyes of each individual one of the plurality of users;

positioning at least one corresponding spatial anchor at: at least one predefined position on the respective frustum cross-sections;

determining respective positions for the at least one graphical element on the respective frustum cross-sections relative to the at least one corresponding spatial anchor;

generating respective images for presenting the at least one graphical element to the eyes of each individual one of the plurality of users, positioning the at least one graphical element at the respective positions; and generating a light field image from the respective images, to present the at least one graphical element to the eyes of each individual one of the plurality of users at the given virtual depth.

Optionally, the method further comprises:

determining a 3D volume within which a head of the at least one user is likely to be present;

identifying respective reflection regions on the semi-reflective surface from which the light emitted by the light-emitting surface is reflected toward different points on a surface of the 3D volume, based on: (i) respective relative positions of the different points with respect to the semi-reflective surface, (ii) the position, orientation, size and curvature of the semi-reflective surface, and (iii) the position, orientation, size and curvature of the light-emitting surface;

determining respective 3D view frustums corresponding to the different points, based on the respective reflection regions on the semi-reflective surface, and the respective relative positions of the different points with respect to the semi-reflective surface;

computing a common 3D view frustum as an intersection of the respective 3D view frustums corresponding to the different points;

for another given virtual depth at which at least one another graphical element is to be presented, determining another frustum cross-section of the common 3D view frustum at the another given virtual depth relative to the given eye of the at least one user;

positioning at least one another spatial anchor at: at least one another predefined position on the another frustum cross-section;

determining a position for the at least one another graphical element on the another frustum cross-section relative to the at least one another spatial anchor; and generating the given image for presenting the at least one another graphical element also to the given eye, positioning the at least one another graphical element at the determined position.

Optionally, in the method, the at least one predefined position includes at least one of: a centre of the frustum cross-section, at least one corner of the frustum cross-section, a centre of at least one edge of the frustum cross-section.

Optionally, the semi-reflective surface is curved, the light-emitting surface is optionally curved, and wherein the method further comprises:

determining an orientation of a 3D shape of the at least one spatial anchor, based on a curvature of an imaginary surface that is positioned at a native optical distance of the autostereoscopic display from the given eye along a viewing direction of the given eye; and determining an orientation of the at least one graphical element, based on the orientation of the 3D shape of the at least one spatial anchor, wherein the step of generating the given image comprises orienting the at least one graphical element according to the determined orientation.

Optionally, the method further comprises:

determining a first frustum cross-section and a second frustum cross-section of the given 3D view frustum at a first virtual depth and a second virtual depth relative to the given eye, wherein at least one of: the first virtual depth, the second virtual depth is different from the given virtual depth;

determining a bounding volume enclosed between the first frustum cross-section and the second frustum cross-section;

positioning a plurality of spatial anchors at a plurality of predefined positions on the bounding volume;

determining a position for at least one another graphical element within the bounding volume relative to the plurality of spatial anchors; and generating the given image for presenting the at least one another graphical element also to the given eye, positioning the at least one another graphical element at the determined position.

Optionally, the autostereoscopic display comprises a plurality of sub-display units, the light-emitting surface being formed by respective light-emitting surfaces of the plurality of sub-display units, wherein the method further comprises performing the step of identifying respective reflection regions, the step of determining respective 3D view frustums, the step of determining respective frustum cross-sections, the step of positioning at least one corresponding spatial anchor, the step of determining corresponding positions of the at least one graphical element, and the step of generating respective images, for each individual one of the plurality of sub-display units.

Optionally, the method further comprises repeating the step of determining the relative position of the given eye, the step of identifying the given reflection region, the step of determining the given 3D view frustum, the step of determining the frustum cross-section, the step of positioning the at least one spatial anchor, the step of determining the position of the at least one graphical element, and the step of generating the given image, during a given time period, wherein the position of the at least one graphical element is updated at a rate lower than a predefined threshold rate.

DETAILED DESCRIPTION OF THE DRAWINGS

Referring to FIG. 1, illustrated is a simplified example implementation of a system incorporating eye position based spatial anchors for a heads-up display, in accordance with an embodiment of the present disclosure. The system 100 is shown to be implemented in a vehicle 102. The vehicle 102 could, for example, be a car, a truck, an aircraft, a speed boat or the like. The system 100 comprises a tracker 104, an autostereoscopic display 106, an optical combiner 108, and at least one processor (for example, depicted as a processor 110). The optical combiner 108 is arranged on an optical path of the autostereoscopic display 106. The optical combiner 108 has a semi-reflective surface 112. The tracker 104 is shown to be implemented, for example, as a tracking camera. A user 114 is shown to be seated on a seat 116 of the vehicle 102. A given reflection region 118 is shown on the semi-reflective surface 112 from which light 120 (depicted using dashed lines with arrows) emitted by a light-emitting surface 122 of the autostereoscopic display 106 is reflected toward a given eye (not shown) of the user 114. It is to be noted that FIG. 1 shows a side view of the vehicle 102, for sake of simplicity only. Due to this, the given reflection region 118 is shown, using a dotted ellipse (for sake of simplicity), from a side view of the semi-reflective surface 112. However, when seen from a front view of the vehicle 102 facing the optical combiner from inside of the vehicle 102, the given reflection region 118 lies on the semi-reflective surface 112 only. The processor 110 is configured to perform various operations, as described earlier with respect to the aforementioned first aspect.

It may be understood by a person skilled in the art that FIG. 1 includes a simplified architecture of the system 100, for sake of clarity, which should not unduly limit the scope of the claims herein. It is to be understood that the specific implementation of the system 100 is provided as an example and is not to be construed as limiting it to specific numbers or types of trackers, autostereoscopic displays, optical combiners, and processors. The person skilled in the art will recognize many variations, alternatives, and modifications of embodiments of the present disclosure.

Figure 2:
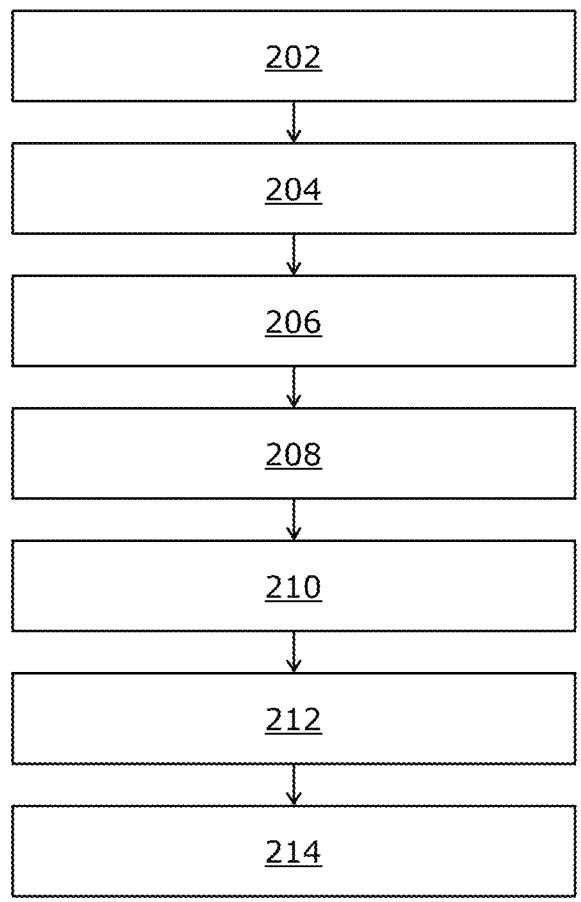
FIG. 2 illustrates steps of a method incorporating eye position based spatial anchors for a heads-up display, in accordance with an embodiment of the present disclosure.

Referring to FIG. 2, illustrated are steps of a method incorporating eye position based spatial anchors for a heads-up display, in accordance with an embodiment of the present disclosure. At step 202, a relative position of a given eye of at least one user is determined with respect to a semi-reflective surface of an optical combiner, using a tracker, the optical combiner being arranged on an optical path of an autostereoscopic display. At step 204, a given reflection region is identified on the semi-reflective surface from which light emitted by a light-emitting surface of the autostereoscopic display is reflected toward the given eye, based on: (i) the relative position of the given eye with respect to the semi-reflective surface, (ii) a position, an orientation, a size and a curvature of the semi-reflective surface, and (iii) a position, an orientation, a size and a curvature of the light-emitting surface. At step 206, a given three-dimensional (3D) view frustum corresponding to the given eye is determined, based on the given reflection region on the semi-reflective surface, and the relative position of the given eye with respect to the semi-reflective surface. For a given virtual depth at which at least one graphical element is to be presented, at step 208, a frustum cross-section of the given 3D view frustum is determined at the given virtual depth relative to the given eye. At step 210, at least one spatial anchor is positioned at: at least one predefined position on the frustum cross-section. At step 212, a position for the at least one graphical element on the frustum cross-section is determined relative to the at least one spatial anchor. At step 214, a given image is generated for presenting the at least one graphical element to the given eye, positioning the at least one graphical element at the determined position.

The aforementioned steps are only illustrative and other alternatives can also be provided where one or more steps are added, one or more steps are removed, or one or more steps are provided in a different sequence without departing from the scope of the claims.

Figure 3:
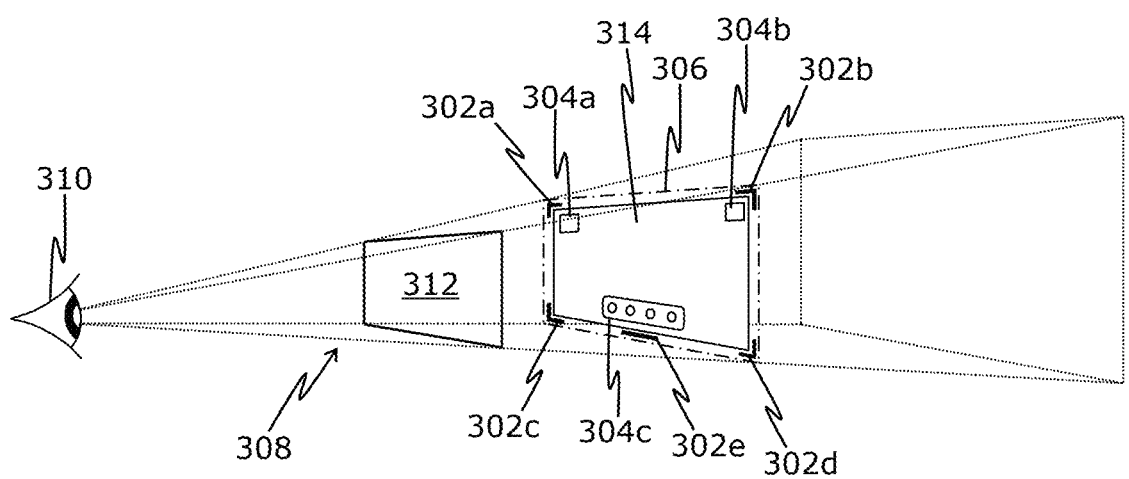
FIG. 3 illustrates an exemplary scenario of how spatial anchors and graphical elements are positioned on a frustum cross-section of a given three-dimensional (3D) view frustum corresponding to a given eye of a user, in accordance with an embodiment of the present disclosure.

Referring to FIG. 3, illustrated is an exemplary scenario of how spatial anchors 302a, 302b, 302c, 302d, and 302e, and graphical elements 304a, 304b, and 304c are positioned on a frustum cross-section 306 of a given three-dimensional (3D) view frustum 308 corresponding to a given eye 310 of a user (not shown), in accordance with an embodiment of the present disclosure. For determining the given 3D view frustum 308, a given reflection region 312 is identified on a semi-reflective surface (not shown for sake of simplicity and clarity) of an optical combiner from which light emitted by a light-emitting surface (not shown for sake of simplicity and clarity) of an autostereoscopic display is reflected toward the given eye 310, based on: (i) a relative position of the given eye 310 with respect to the semi-reflective surface, (ii) a position, orientation, size and curvature of the semi-reflective surface, and (iii) a position, orientation, size and curvature of the light-emitting surface. Then, the given 3D view frustum 308 is determined, based on the given reflection region 312 on the semi-reflective surface, and a relative position of the given eye with respect to the semi-reflective surface. As an example, the given 3D view frustum 308 is depicted as a truncated pyramid made of dotted lines. Other shapes for the given 3D view frustum 308 are also feasible.

Now, for a given virtual depth at which the graphical elements 304a, 304b, and 304c are to be presented, the frustum cross-section 306 of the given 3D view frustum 308 is determined at the given virtual depth relative to the given eye 310. As an example, the frustum cross-section 306 is depicted as a trapezium made of dash-dot lines. Other shapes for the frustum cross-section 306 are also feasible. Each of the spatial anchors 302a, 302b, 302c, 302d, and 302e are then positioned at a predefined position on the frustum cross-section 306. For example, as shown, the spatial anchors 302a, 302b, 302c, and 302d are positioned at four corners of the frustum cross-section 306, respectively. Similarly, the spatial anchor 302e is positioned at a centre of a bottom edge of the frustum cross-section 306.

Then, positions for the graphical elements 304a, 304b, and 304c on the frustum cross-section 306 are determined relative to the spatial anchors 302a, 302b, 302c, 302d, and 302e. For example, the position for the graphical element 304a on the frustum cross-section 306 is determined relative to the spatial anchors 302a. The position for the graphical element 304b on the frustum cross-section 306 is determined relative to the spatial anchors 302b. The position for the graphical elements 304c on the frustum cross-section 306 is determined relative to the spatial anchors 302c, 302d, and 302e. Then, a given image 314 is shown to be generated for presenting the graphical elements 304a, 304b, and 304c to the given eye 310, wherein the graphical elements 304a, 304b, and 304c are positioned at the determined positions. The graphical elements 304a, 304b, and 304c may be two-dimensional (2D) user interface (UI) elements.

Figure 4:
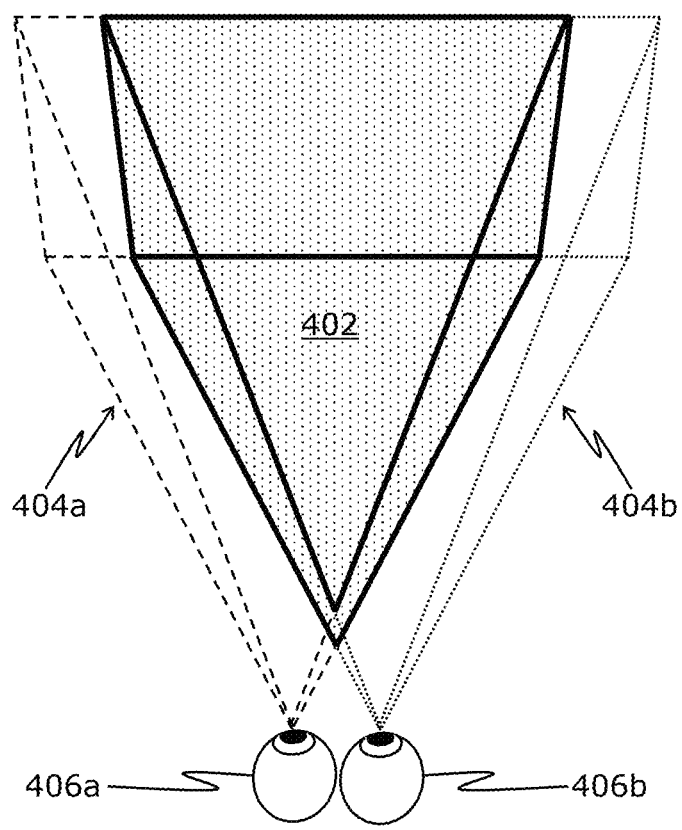
FIG. 4 illustrates an example of a common three-dimensional (3D) view frustum, in accordance with an embodiment of the present disclosure.

Referring to FIG. 4, illustrated is an example of a common three-dimensional (3D) view frustum 402 (depicted using a dotted pyramid), in accordance with an embodiment of the present disclosure. In some implementations, the common 3D view frustum 402 is computed as an intersection of a given 3D view frustum 404a corresponding to a given eye 406a of a given user and another 3D view frustum 404b corresponding to another eye 406b of the given user. The given eye is one of a left eye and a right eye of the given user, while the another eye is another of the left eye and the right eye of the given user. In other implementations, the common 3D view frustum 402 is computed as an intersection of respective 3D view frustums 404a and 404b corresponding to eyes of each individual one of a plurality of users, for example, such as two users wherein the 3D view frustum 404a corresponds to a first user amongst the two users and the 3D view frustum 404b corresponds to a second user amongst the two users.

Figure 5A:
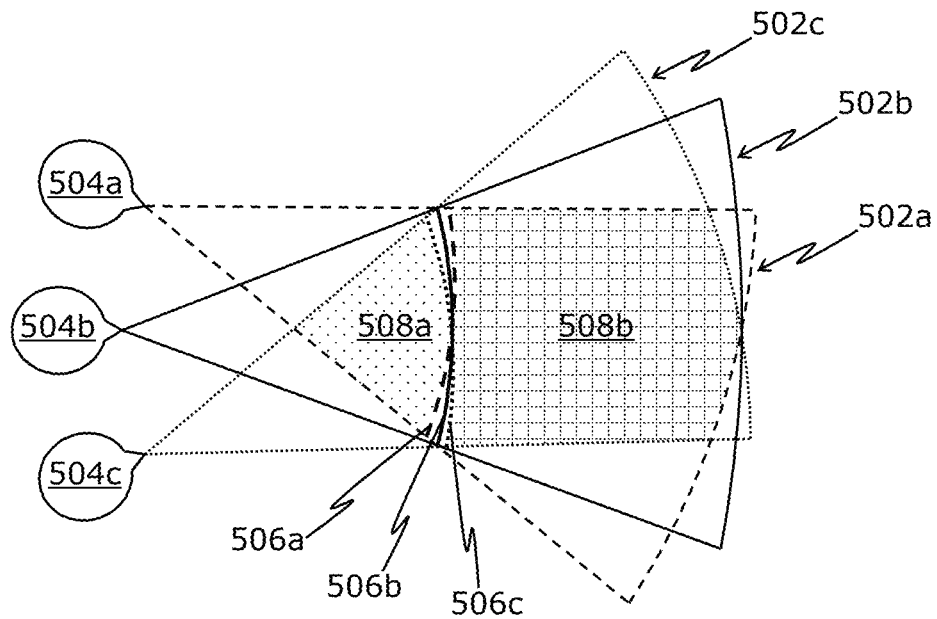
Figure 5B:
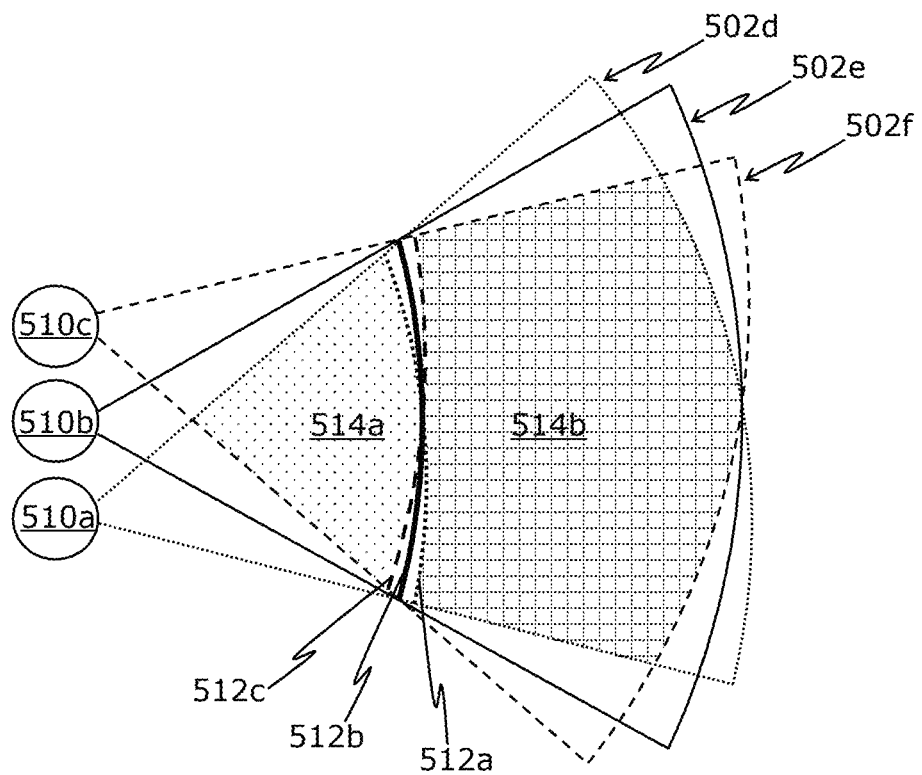
FIG. 5B illustrates an exemplary side view of different 3D view frustums corresponding to different eye heights, in accordance with an embodiment of the present disclosure.

Referring to FIGS. 5A and 5B, FIG. 5A illustrates an exemplary top view of different three-dimensional (3D) view frustums corresponding to different eye positions, while FIG. 5B illustrates an exemplary side view of different 3D view frustums corresponding to different eye heights, in accordance with an embodiment of the present disclosure. With reference to FIG. 5A, a 3D view frustum 502a (depicted using a dashed line curvilinear triangle) corresponds to an eye position 504a, a 3D view frustum 502b (depicted using a solid line curvilinear triangle) corresponds to an eye position 504b, and a 3D view frustum 502c (depicted using a dotted line curvilinear triangle) corresponds to an eye position 504c. The eye position 504a may be understood to be an eye position when viewed from a left side, the eye position 504b may be understood to be an eye position when viewed from a centre, and the eye position 504c may be understood to be an eye position when viewed from a right side. It will be appreciated that in some implementations, the eye positions 504a, 504b, and 504c are understood to be eye positions of a single user, when the single user is viewing a reflection of an autostereoscopic display on a semi-reflective surface of an optical combiner from different positions. In this regard, the eye positions 504a, 504b, and 504c may correspond to different points on a surface of a 3D volume within which a head of the single user is likely to be present. In other implementations, the eye positions 504a, 504b, and 504c are understood to be eye positions of a plurality of users (such as 3 individual users), respectively, when the plurality of users are viewing respective reflections of the autostereoscopic display on the semi-reflective surface from different positions.

Since the reflection of the autostereoscopic display on the semi-reflective surface changes slightly for each of the eye positions 504a, 504b, and 504c, a reflection 506a (depicted using a dashed line curve) corresponds to the eye position 504a, a reflection 506b (depicted using a solid line curve) corresponds to the eye position 504b, and a reflection 506c (depicted using a dotted line curve) corresponds to the eye position 504c. A common 3D view frustum is computed as an intersection of the 3D view frustums 502a, 502b, and 502c. The shown top view depicts areas 508a (depicted using a dotted pattern) and 508b (depicted using a dotted grid pattern) of the common 3D view frustum which are visible from all the eye positions 504a, 504b, and 504c.

It will be appreciated that when a given graphical element is to be presented for all the eye positions 504a, 504b, and 504c and at a given virtual depth that is less than a native optical distance of the autostereoscopic display from a given eye position (i.e., when the given graphical element is to be presented in front of the autostereoscopic display), the given graphical element is presented within the area 508a. On the other hand, when a given graphical element is to be presented for all the eye positions 504a, 504b, and 504c and at a given virtual depth that is greater than the native optical distance (i.e., when the given graphical element is to be presented behind the autostereoscopic display), the given graphical element is presented within the area 508b.

With reference to FIG. 5B, a 3D view frustum 502d (depicted using a dotted line curvilinear triangle) corresponds to an eye height 510a, a 3D view frustum 502e (depicted using a solid line curvilinear triangle) corresponds to an eye height 510b, and a 3D view frustum 502f (depicted using a dashed line curvilinear triangle) corresponds to an eye height 510c. It will be appreciated that in some implementations, the eye heights 510a, 510b, and 510c are understood to be eye heights of a single user (for example, sitting on an adjustable seat of a vehicle), when the single user is viewing a reflection of an autostereoscopic display on a semi-reflective surface of an optical combiner from different heights. In this regard, the eye heights 510a, 510b, and 510c may correspond to different points on a surface of a 3D volume within which a head of the single user is likely to be present. In other implementations, the eye heights 510a, 510b, and 510c are understood to be eye heights of a plurality of users (such as 3 individual users), respectively, when the plurality of users are viewing respective reflections of the autostereoscopic display on the semi-reflective surface from different heights.

Since the reflection of the autostereoscopic display on the semi-reflective surface changes slightly for each of the eye heights 510a, 510b, and 510c, a reflection 512a (depicted using a dotted line curve) corresponds to the eye position 510a, a reflection 512b (depicted using a solid line curve) corresponds to the eye position 510b, and a reflection 512c (depicted using a dashed line curve) corresponds to the eye position 510c. A common 3D view frustum is computed as an intersection of the 3D view frustums 502d, 502e, and 502f. The shown side view depicts areas 514a and 514b of the common 3D view frustum which are visible from all the eye heights 510a, 510b, and 510c.

It will be appreciated that when a given graphical element is to be presented for all the eye heights 510a, 510b, and 510c and at a given virtual depth that is less than the native optical distance, the given graphical element is presented within the area 514a. On the other hand, when a given graphical element is to be presented for all the eye positions 510a, 510b, and 510c and at a given virtual depth that is greater than the native optical distance, the given graphical element is presented within the area 514b.

Figure 6:
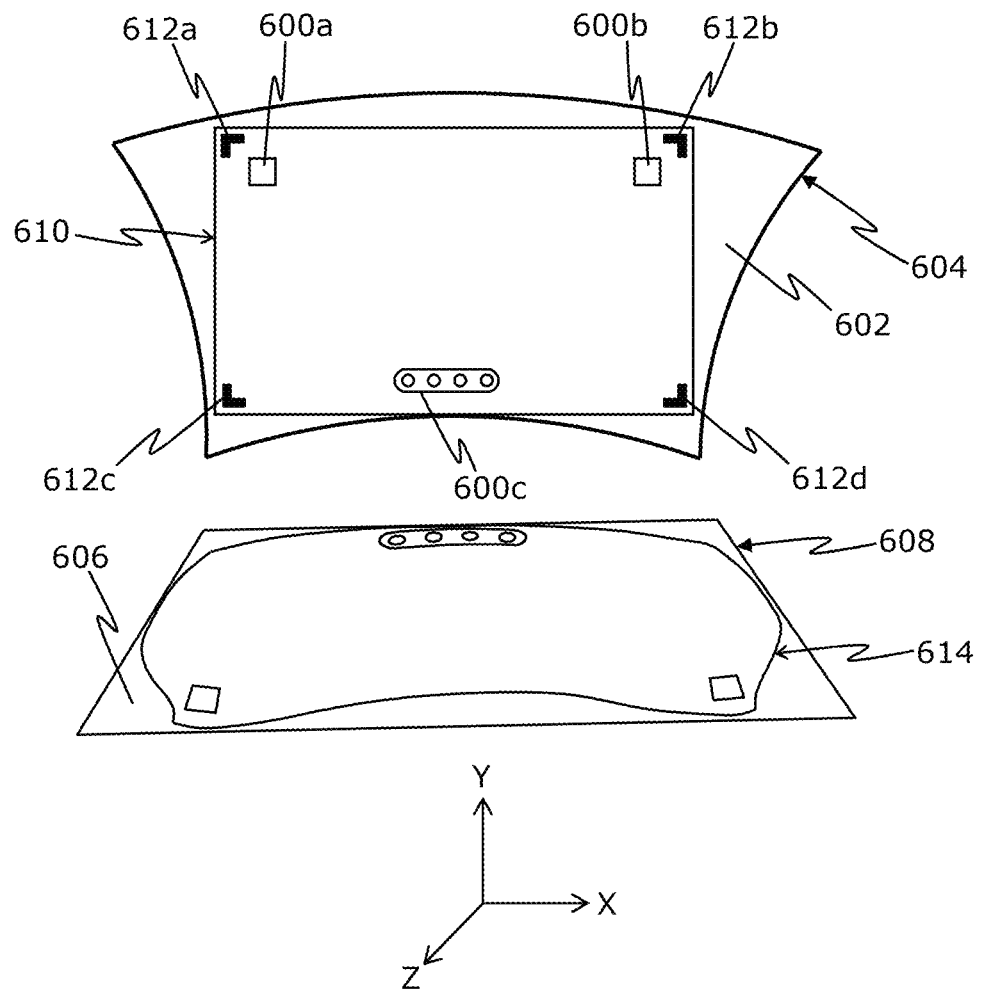
FIG. 6 illustrates an exemplary scenario of positioning graphical elements when a semi-reflective surface of an optical combiner is curved, in accordance with an embodiment of the present disclosure.

Referring to FIG. 6, illustrated is an exemplary scenario of positioning graphical elements 600a, 600b, and 600c when a semi-reflective surface 602 of an optical combiner 604 is curved, in accordance with an embodiment of the present disclosure. When the semi-reflective surface 602 is curved and a shape of a light-emitting surface 606 of an autostereoscopic display 608 is rectangular, a shape of a frustum cross-section (not shown) of a given three-dimensional (3D) view frustum corresponding to a given eye is non-rectangular, wherein the graphical elements 600a, 600b, and 600c are to be presented on the frustum cross-section at a given virtual depth. In such a case, a maximal rectangular region 610 of the frustum cross-section is determined, the maximal rectangular region 610 being aligned with an X-axis of an image plane of the autostereoscopic display 608, and positions for the graphical elements 600a, 600b, and 600c are determined within the maximal rectangular region 610. The positions for the graphical elements 600a, 600b, and 600c within the maximal rectangular region 610 are determined relative to a plurality of spatial anchors 612a, 612b, 612c and, 612d that are positioned at four corners of the frustum cross-section, respectively. A given image 614 is generated and then displayed at the autostereoscopic display 608 for presenting the graphical elements 600a, 600b, and 600c to the given eye, the graphical elements 600a, 600b, and 600c being positioned at the determined positions. It is to be noted that the given image 614 is generated (slightly) distorted to compensate for geometric aberrations arising due to a curvature of the semi-reflective surface 602.

FIGS. 3, 4, 5A, 5B, and 6 are merely examples, which should not unduly limit the scope of the claims herein. A

The invention claimed is:

1. A system comprising:
   a tracker;
   an autostereoscopic display;
   an optical combiner arranged on an optical path of the autostereoscopic display; and
   at least one processor configured to:
      determine a relative position of a given eye of at least one user with respect to a semi-reflective surface of the optical combiner, using the tracker;
      identify a given reflection region on the semi-reflective surface from which light emitted by a light-emitting surface of the autostereoscopic display is reflected toward the given eye, based on: (i) the relative position of the given eye with respect to the semi-reflective surface, (ii) a position, orientation, size and curvature of the semi-reflective surface, and (iii) a position, orientation, size and curvature of the light-emitting surface;
      determine a given three-dimensional (3D) view frustum corresponding to the given eye, based on the given reflection region on the semi-reflective surface, and the relative position of the given eye with respect to the semi-reflective surface;
      for a given virtual depth at which at least one graphical element is to be presented, determine a frustum cross-section of the given 3D view frustum at the given virtual depth relative to the given eye;
      position at least one spatial anchor at: at least one predefined position on the frustum cross-section;
      determine a position for the at least one graphical element on the frustum cross-section relative to the at least one spatial anchor; and
      generate a given image for presenting the at least one graphical element to the given eye, positioning the at least one graphical element at the determined position.

2. The system of claim 1, wherein the at least one processor is configured to:
   determine a relative position of another eye of the at least one user with respect to the semi-reflective surface, using the tracker;
   identify another reflection region on the semi-reflective surface from which the light emitted by the light-emitting surface is reflected toward the another eye, based on: (i) the relative position of the another eye with respect to the semi-reflective surface, (ii) the position, orientation, size and curvature of the semi-reflective surface, and (iii) the position, orientation, size and curvature of the light-emitting surface;
   determine another 3D view frustum corresponding to the another eye, based on the another reflection region on the semi-reflective surface, and the relative position of the another eye with respect to the semi-reflective surface;
   compute a common 3D view frustum as an intersection of the given 3D view frustum and the another 3D view frustum;
   for the given virtual depth at which the at least one graphical element is to be presented, determine at least one frustum cross-section of the common 3D view frustum at the given virtual depth relative to at least one of: the given eye, the another eye;
   position at least one spatial anchor at: at least one predefined position on the at least one frustum cross-section;
   determine a position for the at least one graphical element on the at least one frustum cross-section relative to the at least one spatial anchor;
   generate another image for presenting the at least one graphical element to the another eye, positioning the at least one graphical element at the determined position; and
   generate a light field image from the given image and the another image, to present the at least one graphical element to the given eye and the another eye of the at least one user at the given virtual depth.

3. The system of claim 1, wherein the at least one user is a plurality of users, and wherein the at least one processor is configured to:
   determine respective relative positions of eyes of each individual one of the plurality of users with respect to the semi-reflective surface;
   identify respective reflection regions on the semi-reflective surface from which the light emitted by the light-emitting surface is reflected toward the eyes of each individual one of the plurality of users, based on: (i) the respective relative positions of the eyes with respect to the semi-reflective surface, (ii) the position, orientation, size and curvature of the semi-reflective surface, and (iii) the position, orientation, size and curvature of the light-emitting surface;
   determine respective 3D view frustums corresponding to the eyes of each individual one of the plurality of users, based on the respective reflection regions on the semi-reflective surface, and the respective relative positions of the eyes with respect to the semi-reflective surface;
   compute a common 3D view frustum as an intersection of the respective 3D view frustums corresponding to the eyes of each individual one of the plurality of users;
   for the given virtual depth at which the at least one graphical element is to be presented, determine respective frustum cross-sections of the common 3D view frustum at the given virtual depth relative to the eyes of each individual one of the plurality of users;
   position at least one corresponding spatial anchor at: at least one predefined position on the respective frustum cross-sections;
   determine respective positions for the at least one graphical element on the respective frustum cross-sections relative to the at least one corresponding spatial anchor;
   generate respective images for presenting the at least one graphical element to the eyes of each individual one of the plurality of users, positioning the at least one graphical element at the respective positions; and
   generate a light field image from the respective images, to present the at least one graphical element to the eyes of each individual one of the plurality of users at the given virtual depth.

4. The system of claim 1, wherein the at least one processor is configured to:
   determine a 3D volume within which a head of the at least one user is likely to be present;
   identify respective reflection regions on the semi-reflective surface from which the light emitted by the light-emitting surface is reflected toward different points on a surface of the 3D volume, based on: (i) respective relative positions of the different points with respect to the semi-reflective surface, (ii) the position, orientation, size and curvature of the semi-reflective surface, and (iii) the position, orientation, size and curvature of the light-emitting surface;

determine respective 3D view frustums corresponding to the different points, based on the respective reflection regions on the semi-reflective surface, and the respective relative positions of the different points with respect to the semi-reflective surface;

compute a common 3D view frustum as an intersection of the respective 3D view frustums corresponding to the different points;

for another given virtual depth at which at least one another graphical element is to be presented, determine another frustum cross-section of the common 3D view frustum at the another given virtual depth relative to the given eye of the at least one user;

position at least one another spatial anchor at: at least one another predefined position on the another frustum cross-section;

determine a position for the at least one another graphical element on the another frustum cross-section relative to the at least one another spatial anchor; and generate the given image for presenting the at least one another graphical element also to the given eye, positioning the at least one another graphical element at the determined position.

5. The system of claim 1, wherein a shape of the light-emitting surface is rectangular, and the semi-reflective surface is curved, wherein the at least one processor is configured to:

determine when a shape of the frustum cross-section is non-rectangular;

determine a maximal rectangular region of the frustum cross-section that is aligned with an X-axis of an image plane of the autostereoscopic display; and when determining the position for the at least one graphical element, determine the position for the at least one graphical element within the maximal rectangular region.

6. The system of claim 1, wherein the given virtual depth lies within a predefined threshold range from a native optical distance of the autostereoscopic display from the given eye along a viewing direction of the given eye.

7. The system of claim 6, wherein the semi-reflective surface is curved, the light-emitting surface is optionally curved, and wherein the at least one processor is configured to:

determine an orientation of a 3D shape of the at least one spatial anchor, based on a curvature of an imaginary surface that is positioned at a native optical distance of the autostereoscopic display from the given eye along the viewing direction of the given eye;

determine an orientation of the at least one graphical element, based on the orientation of the 3D shape of the at least one spatial anchor; and when generating the given image, orient the at least one graphical element according to the determined orientation.

8. The system of claim 1, wherein the at least one processor is configured to:

determine a first frustum cross-section and a second frustum cross-section of the given 3D view frustum at a first virtual depth and a second virtual depth relative to the given eye, wherein at least one of: the first virtual depth, the second virtual depth is different from the given virtual depth;

determine a bounding volume enclosed between the first frustum cross-section and the second frustum cross-section;

position a plurality of spatial anchors at a plurality of predefined positions on the bounding volume;

determine a position for at least one another graphical element within the bounding volume relative to the plurality of spatial anchors; and generate the given image for presenting the at least one another graphical element also to the given eye, positioning the at least one another graphical element at the determined position.

9. The system of claim 1, wherein the autostereoscopic display comprises a plurality of sub-display units, the light-emitting surface being formed by respective light-emitting surfaces of the plurality of sub-display units, wherein the at least one processor is configured to perform the step of identifying respective reflection regions, the step of determining respective 3D view frustums, the step of determining respective frustum cross-sections, the step of positioning at least one corresponding spatial anchor, the step of determining corresponding positions of the at least one graphical element, and the step of generating respective images, for each individual one of the plurality of sub-display units.

10. The system of claim 1, wherein the at least one processor is configured to repeat the step of determining the relative position of the given eye, the step of identifying the given reflection region, the step of determining the given 3D view frustum, the step of determining the frustum cross-section, the step of positioning the at least one spatial anchor, the step of determining the position of the at least one graphical element, and the step of generating the given image, during a given time period, wherein the position of the at least one graphical element is updated at a rate lower than a predefined threshold rate.

11. A method comprising:

determining a relative position of a given eye of at least one user with respect to a semi-reflective surface of an optical combiner, using a tracker, the optical combiner being arranged on an optical path of an autostereoscopic display;

identifying a given reflection region on the semi-reflective surface from which light emitted by a light-emitting surface of the autostereoscopic display is reflected toward the given eye, based on: (i) the relative position of the given eye with respect to the semi-reflective surface, (ii) a position, orientation, size and curvature of the semi-reflective surface, and (iii) a position, orientation, size and curvature of the light-emitting surface;

determining a given three-dimensional (3D) view frustum corresponding to the given eye, based on the given reflection region on the semi-reflective surface, and the relative position of the given eye with respect to the semi-reflective surface;

for a given virtual depth at which at least one graphical element is to be presented, determining a frustum cross-section of the given 3D view frustum at the given virtual depth relative to the given eye;

positioning at least one spatial anchor at: at least one predefined position on the frustum cross-section;

determining a position for the at least one graphical element on the frustum cross-section relative to the at least one spatial anchor; and generating a given image for presenting the at least one graphical element to the given eye, positioning the at least one graphical element at the determined position.

12. The method of claim 11, further comprising:
determining a relative position of another eye of the at least one user with respect to the semi-reflective surface, using the tracker;
identifying another reflection region on the semi-reflective surface from which the light emitted by the light-emitting surface is reflected toward the another eye, based on: (i) the relative position of the another eye with respect to the semi-reflective surface, (ii) the position, orientation, size and curvature of the semi-reflective surface, and (iii) the position, orientation, size and curvature of the light-emitting surface;
determining another 3D view frustum corresponding to the another eye, based on the another reflection region on the semi-reflective surface, and the relative position of the another eye with respect to the semi-reflective surface;
computing a common 3D view frustum as an intersection of the given 3D view frustum and the another 3D view frustum;
for the given virtual depth at which the at least one graphical element is to be presented, determining at least one frustum cross-section of the common 3D view frustum at the given virtual depth relative to at least one of: the given eye, the another eye;
positioning at least one spatial anchor at: at least one predefined position on the at least one frustum cross-section;
determining a position for the at least one graphical element on the at least one frustum cross-section relative to the at least one spatial anchor;
generating another image for presenting the at least one graphical element to the another eye, positioning the at least one graphical element at the determined position; and
generating a light field image from the given image and the another image, to present the at least one graphical element to the given eye and the another eye of the at least one user at the given virtual depth.

13. The method of claim 11, wherein the at least one user is a plurality of users, and wherein the method further comprises:
determining respective relative positions of eyes of each individual one of the plurality of users with respect to the semi-reflective surface;
identifying respective reflection regions on the semi-reflective surface from which the light emitted by the light-emitting surface is reflected toward the eyes of each individual one of the plurality of users, based on: (i) the respective relative positions of the eyes with respect to the semi-reflective surface, (ii) the position, orientation, size and curvature of the semi-reflective surface, and (iii) the position, orientation, size and curvature of the light-emitting surface;
determining respective 3D view frustums corresponding to the eyes of each individual one of the plurality of users, based on the respective reflection regions on the semi-reflective surface, and the respective relative positions of the eyes with respect to the semi-reflective surface;
computing a common 3D view frustum as an intersection of the respective 3D view frustums corresponding to the eyes of each individual one of the plurality of users;
for the given virtual depth at which the at least one graphical element is to be presented, determining respective frustum cross-sections of the common 3D view frustum at the given virtual depth relative to the eyes of each individual one of the plurality of users;
positioning at least one corresponding spatial anchor at: at least one predefined position on the respective frustum cross-sections;
determining respective positions for the at least one graphical element on the respective frustum cross-sections relative to the at least one corresponding spatial anchor;
generating respective images for presenting the at least one graphical element to the eyes of each individual one of the plurality of users, positioning the at least one graphical element at the respective positions; and
generating a light field image from the respective images, to present the at least one graphical element to the eyes of each individual one of the plurality of users at the given virtual depth.

14. The method of claim 11, further comprising:
determining a 3D volume within which a head of the at least one user is likely to be present;
identifying respective reflection regions on the semi-reflective surface from which the light emitted by the light-emitting surface is reflected toward different points on a surface of the 3D volume, based on: (i) respective relative positions of the different points with respect to the semi-reflective surface, (ii) the position, orientation, size and curvature of the semi-reflective surface, and (iii) the position, orientation, size and curvature of the light-emitting surface;
determining respective 3D view frustums corresponding to the different points, based on the respective reflection regions on the semi-reflective surface, and the respective relative positions of the different points with respect to the semi-reflective surface;
computing a common 3D view frustum as an intersection of the respective 3D view frustums corresponding to the different points;
for another given virtual depth at which at least one another graphical element is to be presented, determining another frustum cross-section of the common 3D view frustum at the another given virtual depth relative to the given eye of the at least one user;
positioning at least one another spatial anchor at: at least one another predefined position on the another frustum cross-section;
determining a position for the at least one another graphical element on the another frustum cross-section relative to the at least one another spatial anchor; and
generating the given image for presenting the at least one another graphical element also to the given eye, positioning the at least one another graphical element at the determined position.

15. The method of claim 11, wherein a shape of the light-emitting surface is rectangular, and the semi-reflective surface is curved, wherein the method further comprises:
determining when a shape of the frustum cross-section is non-rectangular; and
determining a maximal rectangular region of the frustum cross-section that is aligned with an X-axis of an image plane of the autostereoscopic display,
wherein the step of determining the position for the at least one graphical element comprises determining the position for the at least one graphical element within the maximal rectangular region.

16. The method of claim 11, wherein the semi-reflective surface is curved, the light-emitting surface is optionally curved, and wherein the method further comprises:
- determining an orientation of a 3D shape of the at least one spatial anchor, based on a curvature of an imaginary surface that is positioned at a native optical distance of the autostereoscopic display from the given eye along a viewing direction of the given eye; and
- determining an orientation of the at least one graphical element, based on the orientation of the 3D shape of the at least one spatial anchor,
- wherein the step of generating the given image comprises orienting the at least one graphical element according to the determined orientation.

17. The method of claim 11, further comprising:
- determining a first frustum cross-section and a second frustum cross-section of the given 3D view frustum at a first virtual depth and a second virtual depth relative to the given eye, wherein at least one of: the first virtual depth, the second virtual depth is different from the given virtual depth;
- determining a bounding volume enclosed between the first frustum cross-section and the second frustum cross-section;
- positioning a plurality of spatial anchors at a plurality of predefined positions on the bounding volume;
- determining a position for at least one another graphical element within the bounding volume relative to the plurality of spatial anchors; and
- generating the given image for presenting the at least one another graphical element also to the given eye, positioning the at least one another graphical element at the determined position.

* * * * *